(12) United States Patent
Guzowski et al.

(10) Patent No.: US 6,962,724 B2
(45) Date of Patent: *Nov. 8, 2005

(54) APPARATUS FOR SHIPPING AND PREPARING BAKED FOOD PRODUCTS

(75) Inventors: Christopher P. Guzowski, Hoffman Estates, IL (US); Amy Lynne Zettlemoyer, Chicago, IL (US); Barbara Sue Schwab, Grayslake, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/729,993

(22) Filed: Dec. 4, 2000

(65) Prior Publication Data

US 2002/0068117 A1 Jun. 6, 2002

(51) Int. Cl.[7] .............................................. A21D 10/02
(52) U.S. Cl. ...................... 426/114; 426/115; 426/128; 426/505; 426/523; 99/426; 99/433; 99/447; 99/DIG. 15; 206/514; 206/736; 206/546; 220/573.1
(58) Field of Search ......................... 426/113–115, 128, 426/394, 505, 512, 523; 99/349, 353, 401, 426, 433, 447, DIG. 15; D7/610; 206/551, 514, 736, 541, 546; 220/573.1

(56) References Cited

U.S. PATENT DOCUMENTS

| | | | |
|---|---|---|---|
| 793,653 A | 7/1905 | Gorman | |
| 835,212 A | 11/1906 | Blynt | |
| 843,109 A | 2/1907 | Sabin | |
| 868,312 A | 10/1907 | Wilcox | |
| 1,097,367 A | 5/1914 | Sabin | |
| 1,180,782 A | 4/1916 | McLaughlin | |
| 1,375,539 A | 4/1921 | Scott | |
| 1,827,062 A | 10/1931 | Austin | |
| 1,834,402 A | 12/1931 | Houston | |
| 1,903,682 A | 4/1933 | Moore | |
| 2,174,425 A | 9/1939 | Schlumbohm | 53/7 |
| 2,257,408 A | 9/1941 | Alexander | 53/6 |
| 2,784,664 A | 3/1957 | Tippel | 99/433 |
| 3,724,711 A | 4/1973 | George et al. | 220/63 R |
| 3,951,053 A | 4/1976 | Kirkpatrick | 99/433 |
| 3,987,719 A | 10/1976 | Kian | 99/422 |
| 4,080,884 A | 3/1978 | Terrell | 99/433 |
| 4,122,324 A | 10/1978 | Falk | 219/10.55 E |
| 4,367,243 A | 1/1983 | Brummett et al. | 426/303 |
| 4,542,271 A | 9/1985 | Tanonis et al. | 219/10.55 E |
| 4,563,946 A | 1/1986 | Barlow et al. | 99/450 |
| 4,785,968 A | 11/1988 | Logan et al. | 220/410 |
| 4,865,219 A | 9/1989 | Logan et al. | 220/410 |
| D303,908 S | 10/1989 | Anderson | D7/387 |
| 4,911,634 A | * 3/1990 | Keener | 426/412 |
| 4,963,708 A | 10/1990 | Kearns et al. | 219/10.55 E |
| D333,590 S | 3/1993 | Harris | D7/392.1 |
| 5,206,045 A | 4/1993 | Stuck | 426/243 |
| 5,247,149 A | 9/1993 | Peleg | 219/10.55 E |
| D343,548 S | 1/1994 | Helfer | D7/387 |

(Continued)

FOREIGN PATENT DOCUMENTS

| | | | |
|---|---|---|---|
| EP | 0 316 811 B1 | 8/1989 | |
| EP | 0 316 811 A1 | 8/1989 | ............ H05B/6/64 |

*Primary Examiner*—Drew Becker
(74) *Attorney, Agent, or Firm*—Fitch, Even, Tabin & Flannery

(57) ABSTRACT

Apparatus for shipping and preparing baked food products includes a receptacle containing the food product, a baking shield upstanding above the receptacle, and a shipping carton. To prepare for shipping, the baking shield is placed at the bottom of the receptacle and is configured for a nesting fit. The baking shield may have either a frustoconical sidewall or a concave trough-like sidewall.

12 Claims, 6 Drawing Sheets

U.S. PATENT DOCUMENTS

| | | | |
|---|---|---|---|
| 5,416,304 A | 5/1995 | De La Cruz et al. | 219/730 |
| D362,995 S | 10/1995 | Marsico | D7/387 |
| 5,456,162 A | 10/1995 | Polizzotto | 99/433 |
| D364,533 S | 11/1995 | Brophy | D7/387 |
| 5,503,063 A | 4/1996 | Sebald | 99/447 |
| D369,941 S | 5/1996 | Ramina | D7/387 |
| D384,550 S | 10/1997 | Dernoga | D7/387 |
| D384,857 S | 10/1997 | Beaule | D7/387 |
| 5,806,411 A | 9/1998 | Howle | 99/433 |
| 5,823,098 A | 10/1998 | Perry | 99/433 |
| 5,845,805 A | 12/1998 | Ragland | 220/573.3 |
| D408,215 S | 4/1999 | Williams | D7/387 |
| 6,026,739 A | 2/2000 | Dernoga | 99/433 |
| 6,054,697 A * | 4/2000 | Woodward et al. | 219/729 |

* cited by examiner

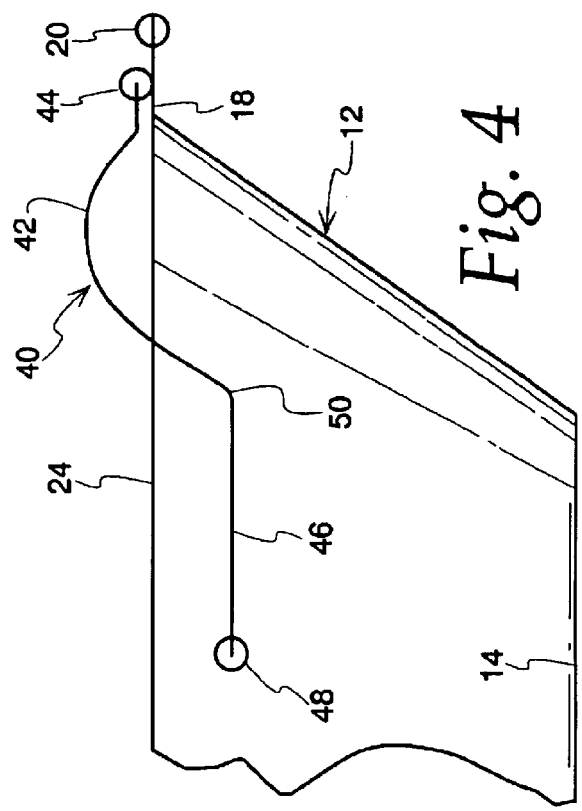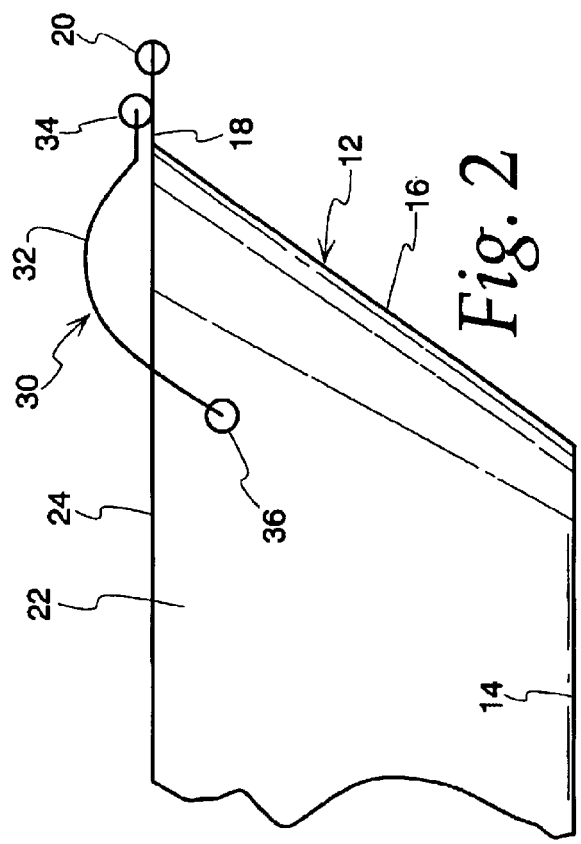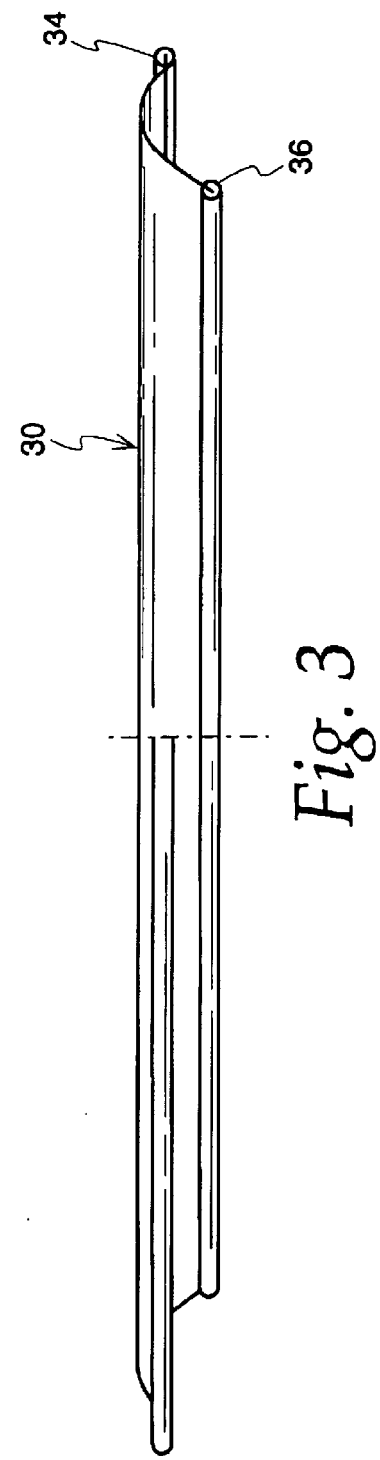

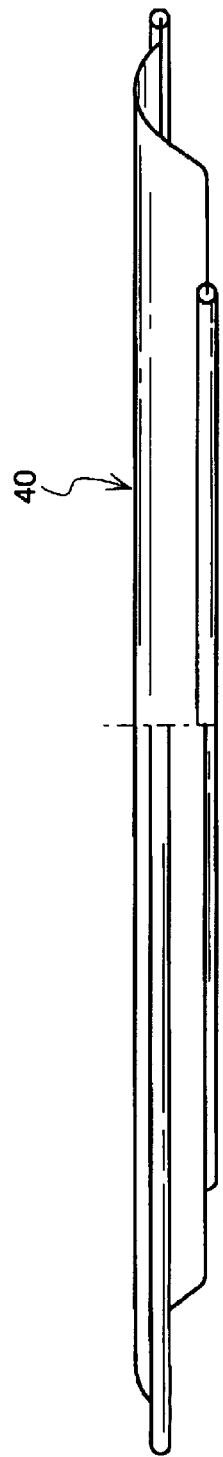
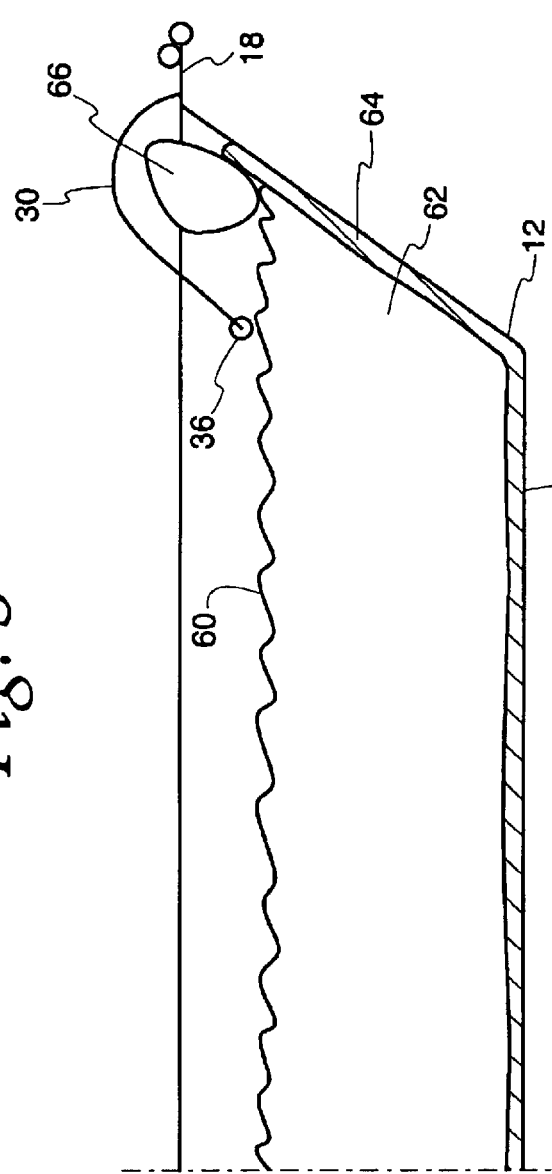

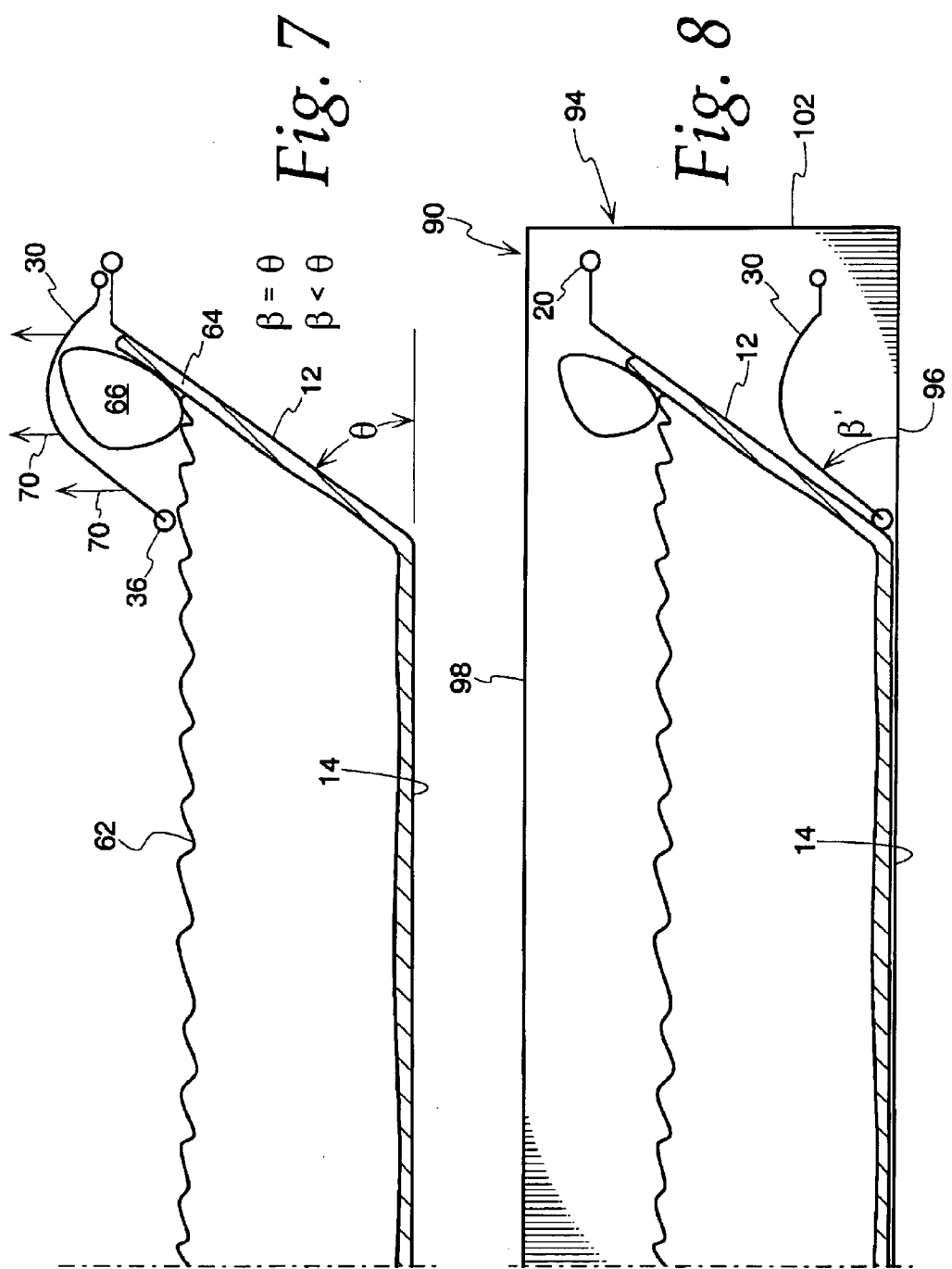

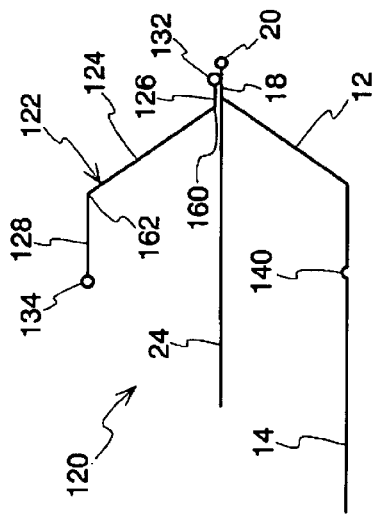
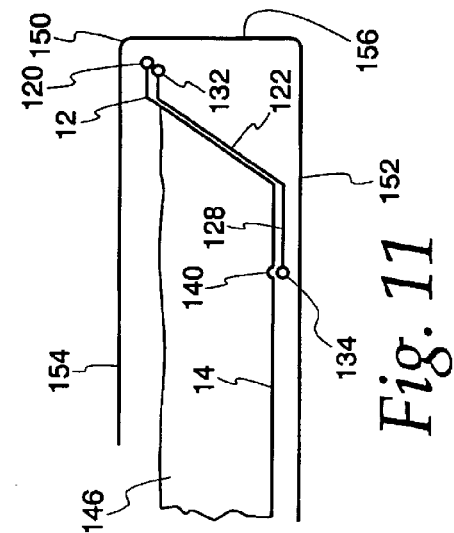
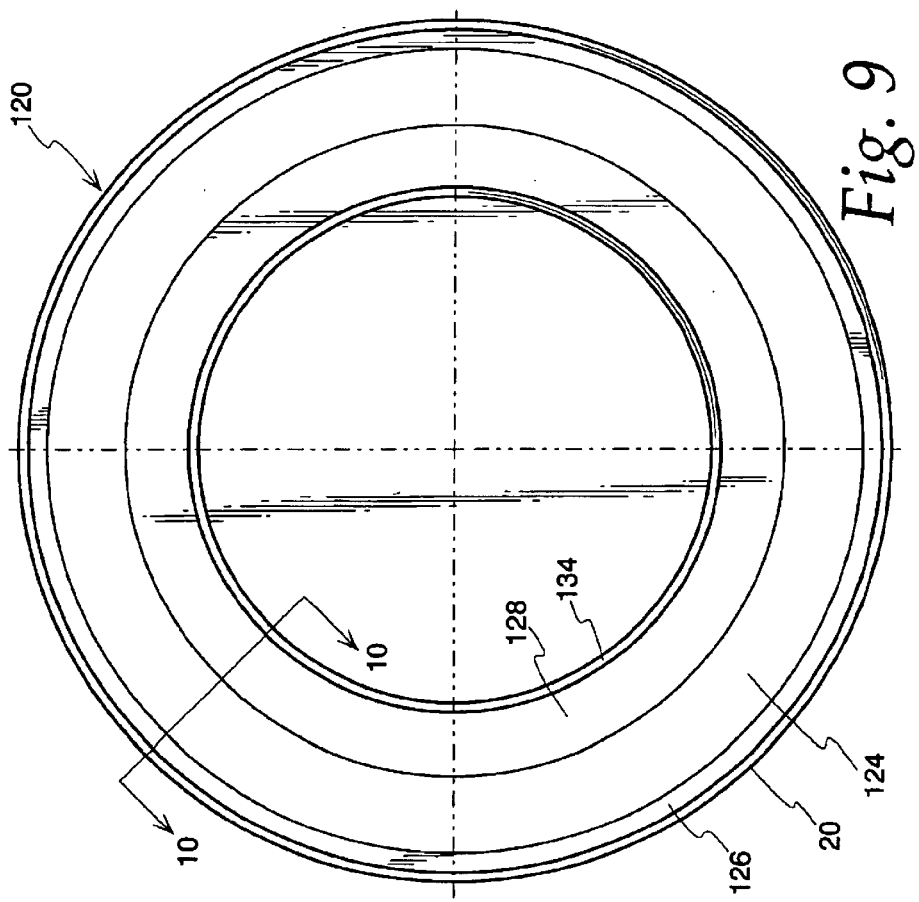

APPARATUS FOR SHIPPING AND PREPARING BAKED FOOD PRODUCTS

BACKGROUND OF THE INVENTION

1. Field of the Invention

The invention pertains to apparatus for baking pies and the like food products which have an outer portion susceptible to overcooking. The invention is also directed to a kit for baking a food product which includes baking utensils packaged for commercial shipment.

2. Description of the Related Art

Bakers of food products, especially those in a commercial environment, have sought to reduce required cooking times without the risk of burning or overcooking sensitive portions of food items. Examples include various types of pie products, including pizza pies. These types of products typically include an outer crust which has been observed to be particularly susceptible to overcooking, due in part to the relatively low mass of the crust at the outer rim of the pie.

Various types of shields have been proposed to protect the sensitive outer portion of pie crusts. Examples of such shields are given in U.S. Pat. No. 5,206,045; U.S. Design Pat. No. 384,857 and a "Pie Saver" product commercially available from Nancy's Kitchen/Beta Bake Products, Inc. of Lewiston, Me. Although the prior art arrangements provide certain improvements to baking shields, further improvements in baking shield performance and in adapting the baking shield for compact commercial packaging are still being sought. In addition, improvements in the manufacture of baking shields are also in demand, especially for high volume commercial products.

SUMMARY OF THE INVENTION

It is an object of the invention to provide a kit for providing baked food products, such as pies, including baking receptacles arranged in a commercial package.

Another object of the invention is to provide baking kits of the above-described type which are quickly and easily deployed by a consumer, prior to baking.

Another object of the invention is to provide baking utensils which are suitable for incorporation with a variety of prepared food product, in preparation for commercial shipment to a consumer.

A further object of the invention is to provide baking shields offering improved performance despite volume expansion of the food product during cooking.

These and other objects according to principles of the present are provided in a kit for shipping and preparing baked food products which has a sensitive outer marginal portion, including a frustoconical receptacle with a bottom, an open top, and an outer rim at the open top. The kit also has a food product disposed within said receptacle, below said outer rim and a baking shield including an upstanding sidewall to engage the outer rim so as to be upstanding therefrom when in an installed position. The baking shield further includes an upper wall inwardly extending from said sidewall so as to form a central opening when in the installed position. The baking shield is stored at the bottom of the receptacle, and a shipping carton surrounds the receptacle and the baking shield.

Other objects of the invention are attained in a packaging kit for shipping baking utensils with a frustoconical receptacle with a bottom, an open top, and an outer rim at the open top. The kit also has a baking shield including an upstanding sidewall to engage the outer rim so as to be upstanding therefrom when in an installed position and an upper wall inwardly extending from said sidewall so as to form a central opening when in the installed position. The baking shield stored at the bottom of the receptacle, and a shipping carton surrounds the receptacle and the baking shield.

Additional objects of the invention are attained in a kit for preparing an uncooked or partially cooked pizza pie, having a frustoconical receptacle having a bottom, an open top, and an outer rim at the open top, a pizza pie disposed within the receptacle, and a baking shield including an upstanding sidewall to engage the outer rim so as to be upstanding therefrom. The baking shield also includes an upper wall inwardly extending from said sidewall so as to form a central opening, and the sidewall of the baking shield has a first frustoconical portion and a second annular portion.

If desired, the baking shield of the kits described above can be used separately in other applications. For example, advantages of the invention can be attained in a baking shield for protecting an outer sensitive portion of a food product, held in a receptacle which has an outer rim, during baking. The shield includes an upstanding sidewall to engage the outer rim so as to be upstanding therefrom, and an upper wall inwardly extending from said sidewall so as to form a central opening. The sidewall of the baking shield includes an annular trough portion which has a first end adjacent the outer rim of the receptacle and a second end extending toward the center of the receptacle.

Further advantages of the invention can be attained in another baking shield for protecting an outer sensitive portion of a food product, held in a receptacle which has an outer rim, during baking. The baking shield has an upstanding sidewall to engage the outer rim so as to be upstanding therefrom, and an upper wall inwardly extending from said sidewall so as to form a central opening. The sidewall of the baking shield has a frustoconical portion disposed between first and second annular portions.

BRIEF DESCRIPTION OF THE DRAWINGS

FIG. 2 is a cross-sectional view taken along the line 2—2 of FIG. 1;

FIG. 3 is a fragmentary elevational view thereof;

FIG. 4 is a fragmentary cross-sectional view showing an alternative baking utensil arrangement;

FIG. 5 is a fragmentary elevational view for the baking utensil arrangement of FIG. 4;

FIG. 6 shows a food product in combination with the arrangement of FIG. 2;

FIG. 7 is a view similar to that of FIG. 6 but showing the shield being raised during baking;

FIG. 8 shows the baking utensil and food product in a shipping carton;

FIG. 9 is a top plan view of an alternative embodiment of the baking apparatus according to principles of the invention;

FIG. 10 is a fragmentary cross-sectional view taken along the line 10—10 of FIG. 9;

FIG. 11 is a cross-sectional view similar to that of FIG. 10 but showing the shield in an inverted, nested position, ready for shipment.

DETAILED DESCRIPTION OF THE PREFERRED EMBODIMENTS

Figure 1:
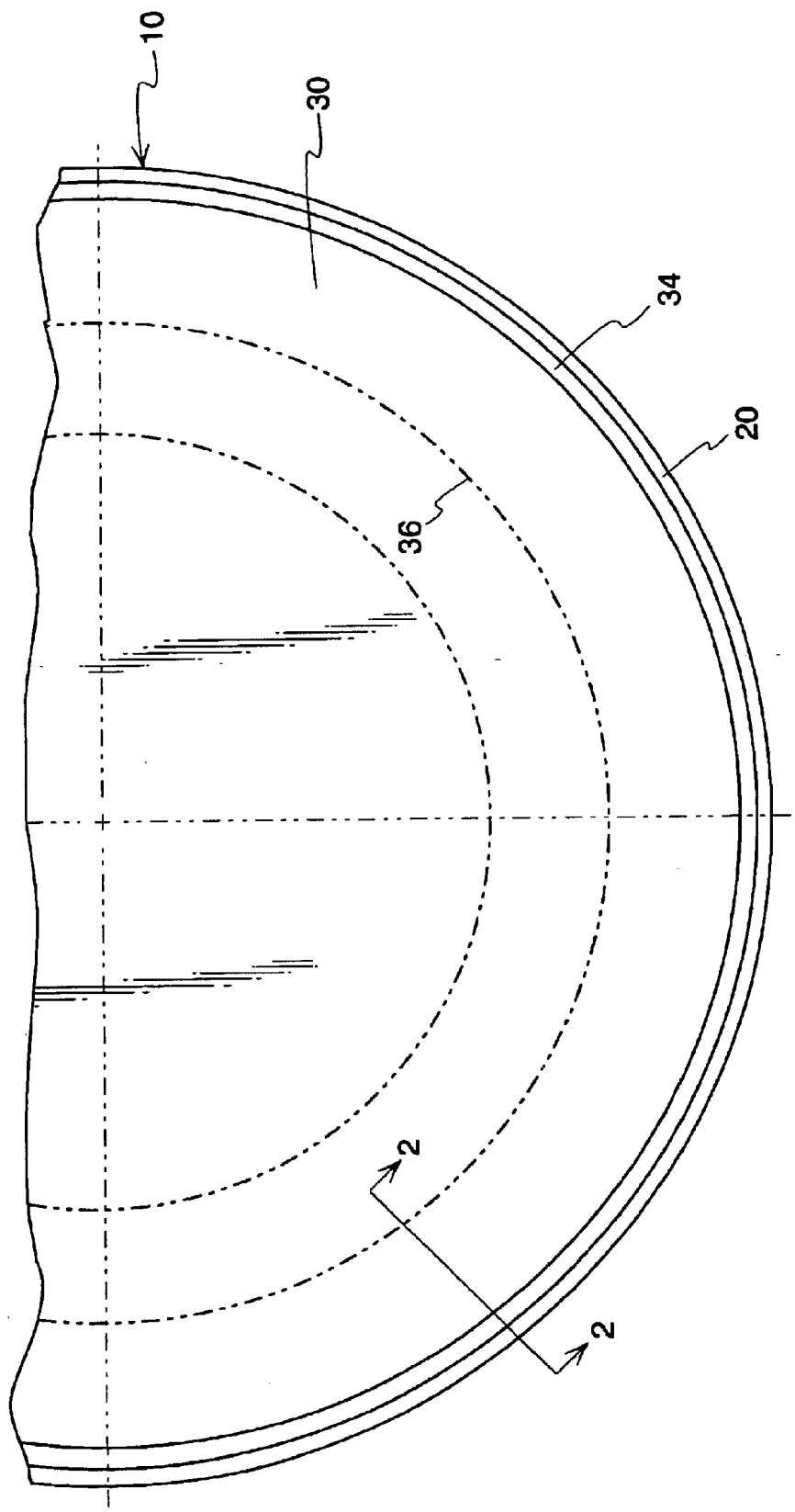
FIG. 1 is a plan view of baking utensils according to principles of the invention.

Referring now to the drawings, and initially to FIGS. 1–3, a baking utensil arrangement is generally indicated at 10. As shown in FIG. 2, a receptacle 12 is preferably made of aluminum foil although other materials could also be employed, if desired. Receptacle 12 has a bottom 14, a pressed conical sidewall 16 and an outer rim 18 having an outer free edge 20, which preferably is rolled. Receptacle 12 defines a cavity 22 and an open top 24.

A baking shield 30 preferably made of light weight aluminum foil includes a concave or trough portion 32 having a first end 34 adjacent the outer rim 28 of receptacle 12 and a second end 36 extending toward the center of receptacle 12. As indicated in FIG. 2, the second end of baking shield 30 preferably lies below the top 24 of receptacle 12, so as to penetrate cavity 22. As indicated in the figures, the ends 34, 36 of baking shield 30 preferably have rolled edges. As shown in FIG. 2, baking shield 30 is preferably dimensioned such that outer edge 34 receives support from receptacle 12, and most preferably the rim 18 of receptacle 12.

Referring to FIGS. 4 and 5, an alternative embodiment of the baking shield is generally indicated at 40. Baking shield 40 also has an annular trough portion 42 with an end 44 adjacent the outer end 20 of receptacle 12. However, unlike baking shield 30, baking shield 40 includes an annular, generally horizontal portion 46 with a free end 48, which is preferably rolled. Baking shield 40 includes a curved or radiused portion 50, although a sharp corner or other cross-sectional shape can be employed to blend trough portion 42 with annular portion 46. As with baking shield 30, it is generally preferred that the interior portion of baking shield 40 be disposed below the top 24 or receptacle 12. However, if desired, the interior ends 36, 48 of baking shields 30, 40 could be raised to a point at or above the top end of receptacle 12. It is generally preferred that baking shield 40 be dimensioned such that the outer end 44 receive support directed from the outer portion of receptacle 12, preferably rim 18.

Baking shields 30, 40 according to principles of the invention, provide a number of advantages. For example, it is generally preferred that the baking shields be formed of relatively light weight aluminum material which receives structural strength from the concave bending to form the trough portions of the baking shields. In the preferred embodiment, baking shield 30 is formed from aluminum material having a thickness ranging between 0.0020 and 0.0050 inch. Most preferably, baking shield 30 is formed from aluminum material having an approximate thickness of 0.0025 inch. It is also preferred that the ends of the baking shields contain rolled edges to provide further stiffness. If further strengthening of the baking shield is desired, the baking shield can be formed with a plurality of generally radially extending grooves or ridges to take on a "corrugated" effect.

In the preferred embodiment, the receptacle 12 (and hence the baking shields) have a circular shape when viewed from above. Accordingly, the baking shields of the preferred embodiment form an endless loop when viewed in plan. The rolled edges taken in combination with the concave trough portion adds a substantial amount of strength when arranged in a circular form, as in the preferred embodiment. Baking shield 40 also benefits from the joining portion 50 which, in the preferred embodiment, forms a circular interior corner. It will be readily appreciated by those skilled in the art that the baking shields can be readily configured to conform to a receptacle which is square or otherwise polygonal in shape, when viewed from above.

Baking utensil arrangements according to principles of the invention offer further advantages, particularly when baking shield portions thereof are formed of light weight foil material. As noted above, it is preferred that the outer ends 34, 44 of baking shields 30, 40 nest within the outer edge 20 of receptacle 12. This allows a user to grasp receptacle 12 in a usual manner, without inadvertently applying pressure to the baking shields. This is important, for example, when a user wishes to temporarily remove the baking utensil arrangement in order to inspect cooking progress, thereafter returning the baking utensil arrangement to the oven for further baking. Further, by dimensioning the baking shields 30, 40 to a size smaller than that of the free edges of the receptacle rim, the baking shield is held in place, in its desired position, during baking, even in the presence of relatively strong convection currents which may be set up within an oven.

With reference to FIGS. 2 and 4, the trough portions of baking shields 30, 40 help to direct radiant energy toward the center of receptacle 12 where the greatest mass of food product is located. With reference to FIGS. 6 and 7, and initially to FIG. 6, the interior free edge 36 of baking shield 30 is located at or near the upper edge 60 of a food product. Illustrated in FIG. 6 is a pizza pie food product having a filling 62, a crust 64 and an optional dough ring 66 which may be formed integrally with crust 64 but, when provided, is preferably separately formed from crust 64. If desired, the baking shield may be used to provide different baking characteristics for the dough ring 66 relative to that of crust 64. During cooking, the level of filling 62, of dough ring 66 or crust 64 will rise or expand during baking, causing the baking shield 30 to "lift off", being displaced in a vertical direction, as indicated by arrows 70. The concave, trough portion of baking shield 30 imparts a balance, or positional stability to the baking shield throughout the cooking process.

The food product mentioned above comprises a conventional, cost efficient pizza pie having a sensitive outer peripheral portion which includes a relatively low mass, low heat capacity portion comprising crust 64 and optional dough ring 66. The baking shields herein provide a shielding or retarding of the heating effects on this sensitive outer marginal portion, allowing the food product to be uniformly cooked, without rendering the outer marginal portion less desirable.

Although pizza pies have been found to receive immediate commercial benefit from the invention, it must be recognized that the invention may also be employed with other types of food products, such as thick soups and stews, as well as dinners of macaroni and cheese, chicken fettuccine, ravioli or lasagne, for example. Although these products do not have crust portions in the sensitive outer marginal area, those familiar with food preparation will recognize that the outer margin of these types of food products may nonetheless overcook or become thicker or otherwise less desirable than central portions of food product disposed in receptacle 12.

Although a substantial improvement in the structural integrity of the baking shields is provided by the invention, it must be recognized that the preferred choice of material, relatively light weight aluminum foil, still renders the baking shields susceptible to crushing, especially when a substantial force is applied. Referring to FIG. 6, for example, a manufacturer may wish to provide consumers with a kit for shipping and preparing baked food products having sensitive outer marginal portions. With the food and the baking kit is shipped in the form shown in FIG. 6, protection must be provided for the dome or trough portion of the baking shield. Such protection, in order to be effective, must receive support from the rim of the receptacle or from the surface supporting floor 14 of the receptacle. Such protection, and the arrangement shown in FIG. 6 must then be overwrapped to prevent contamination during shipment.

Referring to FIG. 8, a kit for shipping and preparing baked food products is generally indicated at 90. Kit 90 includes the aforementioned baking utensils, including receptacle 12 and baking shield 30. Kit 90 further includes the food product contained in receptacle 12 and an outer carton 94 having a bottom wall 96 supporting the bottom wall 14 of receptacle 12, an opposed upper wall 98 and a sidewall 102. As indicated in FIG. 8, baking shield 30 is dimensioned and configured so as to nest with the bottom portion of receptacle 12, in a manner with holds the baking shield in a protected fixed position, during shipment. Preferably, the inner end 36 of baking shield 30 is dimensioned so as to receive the bottom portion of receptacle 12. Further, it is preferred that the interior part of trough portion 30 form an angle β less than or equal to the angle θ of receptacle 12 (see FIG. 7). This arrangement allows a close fit in the corner of carton 90 defined by trapezoidal sidewall of receptacle 12. As shown in FIG. 8, for example, with shifting of the carton contents, the outer edge 20 of receptacle 12 will contact carton sidewall 102, preventing damage to the baking shield 30.

Referring to FIGS. 4 and 8, baking shield 40 can be substituted in the kit arrangement shown in FIG. 8. Preferably, portion 42 of baking shield 40 is configured to be substantially identical with baking shield 30, and annular portion 46 is positioned to underlie the bottom wall 14 of receptacle 12. It is generally preferred in this arrangement, that portion 46 be formed to take on a planar configuration so as to conform to the bottom wall 14 of receptacle 12 to avoid crushing or other deformation. For a close tolerance nesting fit, curvature of corner 50 is made to conform to the lower corner of receptacle 12, between the bottom and sidewalls. If desired, the internal diameter of corner 50 can be made slightly larger than the diameter of bottom wall 14 of receptacle 12. As a further alternative, baking rings and packaging arrangements according to the invention can readily accommodate receptacles having a different shape from that illustrated in the drawings. For example, with reference to FIG. 7, the angle θ can be made more vertical, but preferably will have a value less than 90 degrees. smaller angles, such as those illustrated in the figures, are generally desired because they exhibit a greater strength in shipping and are more conducive to the shapes of the nested baking shields of the type described herein. In either event, it will be appreciated that baking shield 40, when arranged in the packaging arrangement shown in FIG. 8, will be maintained in a secure position without crushing during shipment.

Figure 12:
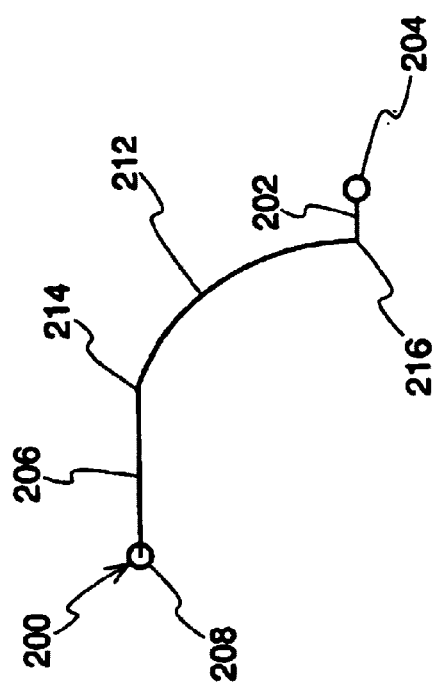

Turning now to FIGS. 9–11, another baking utensil arrangement is generally indicated at 120. With reference to FIG. 10, included in arrangement 120 is receptacle 12 and a baking shield 122 having a frustoconical portion 124 disposed between annular portions 126, 128. If desired, sidewall 124 can be curved so as to be concave when viewed from the interior of receptacle 20 (as shown in FIG. 12, for example). As will be appreciated by those skilled in the art, the annular portion 128 can be readily re-dimensioned, as desired, without a complicated change in the required tooling.

As with the aforementioned baking shields, baking shield 122 stands above the upper end 124 of receptacle 12 and is configured so as to extend inwardly, toward the center of the receptacle, and the food product contained therein. As mentioned above with reference to FIGS. 7 and 8, a dough ring may be provided at the upper corner of the food product. The upstanding baking shield 122 allows clearance such that contact with the dough ring is avoided as the dough rises. Further, the baking shield 122 prevents radiative heat transfer to the sensitive portion of the food product, while allowing convective heat transfer to circulate around the dough ring, providing sufficient, non-scorching heat to permit the dough ring to fully rise.

Preferably, the baking shield 122 is formed of aluminum foil, having a thickness range as stated above with respect to the other baking shields. It is generally preferred that annular portions 126, 128 have finished, free edges 132, 134 which are preferably rolled. The free edge 132 is dimensioned so as to receive support from rim portion 18 of receptacle 12 and so as to lie inwardly of rolled edge 20. This arrangement assures desired orientation of the baking shield with respect to receptacle 12, despite convection currents in the baking oven, or misaligning forces as the baking utensil arrangement is transferred into and out of an oven. With the invention, annular portion 128 can be readily re-dimensioned as required to adjust the portion of food product shielded from radiative scorching or overcooking.

Packaging of the baking utensil arrangement 120 is shown in FIG. 11. Baking shield 122 is inverted from its operational or installed position indicated in FIG. 10. Preferably, the frustoconical wall 124 is configured such that included angles formed between the frustoconical wall and annular walls 126, 128 conform to the configuration of receptacle 12 SO as to form a close fit nesting arrangement shown in FIG. 11. With reference to FIGS. 10 and 11, a trough or recess 140 may be formed in lower wall 13 so as to receive the rolled free edge 134 of baking shield 122. The baking utensils may be shipped alone, or in combination with a food product schematically indicated at 146. A carton 150 is provided for shipment and includes a bottom wall 152 to support both receptacle 12 and baking shield 122, an opposed top wall 154 and a sidewall 156. As indicated in FIG. 11, it is generally preferred that the free edge 132 be dimensioned so as to fit within the free edge 20 of receptacle 12, so as to receive protection, during shipment.

Figure 13:
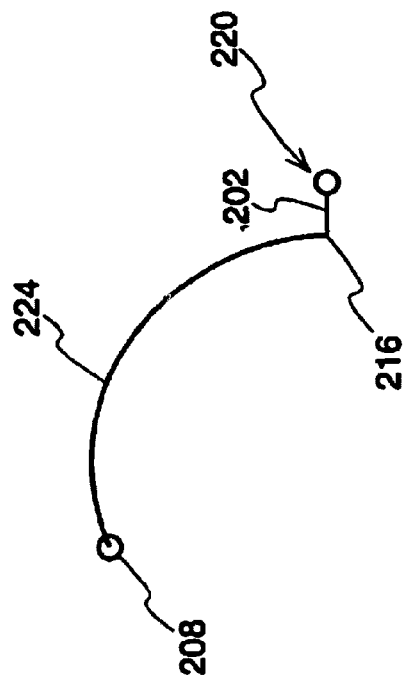
FIGS. 12 and 13 show alternative baking shield arrangements.

Referring now to FIGS. 12 and 13, alternative embodiments of the baking shield are shown. In FIG. 12 a baking shield 200 includes a lower annular rim portion 202 terminating in an edge 204 which is preferably rolled. Baking shield 200 further includes an upper annular portion 206 having an end 208 which is also preferably rolled. A concave sidewall 212 extends between points 214, 216, i.e., at the inner ends of annular portions 202, 206. The shield 200 is preferably formed of aluminum material having a thickness as stated above with the other baking shields, but can be made from other conventional materials, as well. Most preferably, the annular walls 202, 206 correspond in size to the annular walls 126, 128 shown in FIG. 10. That is, most preferably, baking shield 200 is a modification of baking shield 122, replacing the frustoconical wall 124 shown in FIG. 10 with a concave wall 212 shown in FIG. 12.

FIG. 13 shows a further alternative baking shield 220 substantially identical to baking shield 200 but with the upper annular wall 206 and concave wall 212 being replaced by a single, continuous curved wall 224. Baking shield 220 is preferably made of aluminum material of the thicknesses states above for the other baking shields. As with the other baking shields described herein, it is preferred that baking shield 220 be formed of a single piece, monolithic construction, as by forming a sheet of appropriate aluminum material.

It will be readily appreciated that the invention accommodates a variety of different packaging methods. For example, it may be desirable to apply an overwrap of plastic film or other material to the arrangement illustrated in FIG. 6 or to the receptacle 20 and its contents, shown in FIG. 8. With the preferred nesting arrangement shown in FIG. 8, an overwrap may be applied to both the shield 30 as well as receptacle 20 and its contents contained therein. In a similar manner an overwrap may be applied to the nested arrangement of shield 122 and receptacle 20 shown in FIG. 11 and the more compact nested arrangement of FIG. 11 is advantageous in assuring that deformation of shield 122 will not develop when the overwrapping is applied to the contents located within the carton 150.

Advantages of increased structural stability are provided by the invention. As mentioned, the edges 132, 134 of baking shield 122 are rolled, adding stiffness to a product which is preferably formed from light weight foil material, as mentioned. In addition, baking shield 122 is formed with two laterally and vertically offset interior corners 160, 162 which contribute with the rolled edges to provide heretofore unobtained structural strength and rigidify. As schematically indicated in FIG. 10, it is generally preferred that annular wall 126 be substantially smaller in size than upper annular wall 128. This allows the rolled free edge 132 and the substantial portion of annular wall 126 to receive direct support from rim 18 of receptacle 12. With the preferred rolled edge 132, interference with rolled edge 20 prevents "pancake" deformation or outward spreading or collapse of the baking shield as pressure is applied from above. Resistance to spreading deformation is further provided by the inclusion of two interior corners 160, 162 and by the rolled inner edge 134 of the baking shield.

If desired, baking shields according to the invention can be made from much heavier "permanent" weight aluminum material, commonly used for pots or pans, for example. While aluminum is the most preferred material for making the baking shield, other materials, such as ceramics and polymers, as well as treated paper products, could also be employed, for example.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A kit for shipping and preparing baked food products having a sensitive outer marginal portion, comprising:

a frustoconical receptacle having a bottom, an open top, and an outer rim at the open top;

a food product disposed within said receptacle, below said outer rim;

a baking shield movable from a storage position at the bottom of the receptacle to an installed position atop the receptacle, said baking shield having a downwardly facing concave annular body with an outwardly extending rim overlying said receptacle rim when in the installed position, said annular body having an inner free edge below said receptacle rim and defining a central opening when in the installed position;

the baking shield stored at the bottom of the receptacle; and a shipping carton surrounding the receptacle and the baking shield.

2. The kit of claim 1 wherein the shipping carton includes a bottom wall supporting the bottom of the receptacle and the baking shield.

3. The kit of claim 1 wherein the bottom of the receptacle is received in the central opening of the baking shield so as to cooperate with the shipping carton to maintain the baking shield in a controlled position during shipping.

4. The kit of claim 1 wherein the baking shield is stored at the bottom of the receptacle in a position inverted from the installed position.

5. The kit of claim 1 wherein said food product comprises a pizza pie.

6. The kit of claim 1 wherein the baking shield is made of metal foil.

7. The kit of claim 1 wherein the receptacle is made of metal foil.

8. A packaging kit for shipping baking utensils, comprising:

a frustoconical receptacle having a bottom defining an annular recess, an open top, and an outer rim at the open top;

a baking shield movable from a storage position at the bottom of the receptacle to an installed position atop the receptacle, said baking shield having a frustoconical sidewall with upper and lower ends, an inwardly extending top wall having an inner edge with a bead defining a central opening and an outwardly extending rim overlying said receptacle rim when in the installed position;

the bottom of the receptacle nested in the baking shield, with the bead received in the annular recess when the baking shield is in the storage position, so as to cooperate with a shipping carton to maintain the baking shield in a controlled position during shipping;

the baking shield stored at the bottom of the receptacle; and the shipping carton surrounding the receptacle and the baking shield.

9. The kit of claim 8 wherein the baking shield is stored at the bottom of the receptacle in a position inverted from the installed position.

10. The kit of claim 8 wherein the shipping carton includes a bottom wall supporting the bottom of the receptacle and the baking shield.

11. The kit of claim 8 wherein the receptacle is made of metal foil.

12. The kit of claim 8 wherein the baking shield is made of metal foil.

* * * * *

UNITED STATES PATENT AND TRADEMARK OFFICE
CERTIFICATE OF CORRECTION

PATENT NO.         : 6,962,724 B2
APPLICATION NO. : 09/729993
DATED              : November 8, 2005
INVENTOR(S)        : Guzowski et al.

It is certified that error appears in the above-identified patent and that said Letters Patent is hereby corrected as shown below:

On Title Page Item (56), under (Foreign Patent Documents), line 1, after "8/1989", insert -- HO5B/6/64 --.

Signed and Sealed this

Twenty-first Day of November, 2006

JON W. DUDAS
*Director of the United States Patent and Trademark Office*